(12) United States Patent
Mangels et al.

(10) Patent No.: US 6,900,260 B1
(45) Date of Patent: May 31, 2005

(54) USE OF ASSOCIATIVE THICKENERS BASED ON POLYURETHANE AND/OR DIPROPYLENE GLYCOL MONOALKYL ETHERS IN COLORED AND/OR DECORATIVE EFFECT MULTI-LAYERED LACQUERS

(75) Inventors: Ines Mangels, Münster (DE); Karl-Heinz Josten, Veitshöchheim (DE); Udo Nenner, Werfheim (DE); Egon Wegner, Veitshöchheim (DE); Ekkehard Sapper, Rimpar (DE); Nicola Zarse, Münster (DE)

(73) Assignee: BASF Coatings AG, Munster (DE)

( * ) Notice: Subject to any disclaimer, the term of this patent is extended or adjusted under 35 U.S.C. 154(b) by 399 days.

(21) Appl. No.: 10/088,376

(22) PCT Filed: Aug. 31, 2000

(86) PCT No.: PCT/EP00/08503

§ 371 (c)(1),
(2), (4) Date: Mar. 11, 2002

(87) PCT Pub. No.: WO01/21720

PCT Pub. Date: Mar. 29, 2001

(30) Foreign Application Priority Data

Sep. 23, 1999 (DE) .......................................... 199 45 574

(51) Int. Cl.[7] .............................. C08J 3/00; C08K 5/06; C08L 75/00
(52) U.S. Cl. ....................... 524/366; 524/376; 524/591; 524/839; 524/840
(58) Field of Search ............................... 524/366, 376, 524/591, 839, 840

(56) References Cited

U.S. PATENT DOCUMENTS

| | | | |
|---|---|---|---|
| 5,204,401 A | * 4/1993 | Anderson et al. ........... | 524/441 |
| 5,612,408 A | 3/1997 | Konig et al. ................ | 524/591 |
| 5,698,628 A | * 12/1997 | Masuda et al. ............. | 524/806 |
| 5,726,244 A | * 3/1998 | McGee et al. ............... | 525/78 |
| 5,739,194 A | 4/1998 | Natesh et al. | |
| 5,955,063 A | 9/1999 | Brody et al. ................... | 424/61 |
| 6,001,915 A | 12/1999 | Schwarte et al. ........... | 524/457 |
| 6,337,139 B1 | 1/2002 | Sapper | |

FOREIGN PATENT DOCUMENTS

| | | | |
|---|---|---|---|
| CA | 2166290 | 11/1995 | |
| DE | 4415292 | 11/1995 | |
| EP | 038 127 A1 | 3/1981 | ............ B05D/7/26 |
| EP | 249 201 A2 | 6/1987 | ............ C09D/3/58 |
| EP | 276 501 A2 | 9/1987 | ............ C11D/1/42 |
| EP | 302 240 A1 | 7/1988 | ............ C09D/7/12 |
| EP | 906 157 A1 | 9/1998 | ............ C08G/18/01 |
| WO | WO94/22968 | 10/1994 | ......... C09D/133/06 |
| WO | WO97/12945 | 4/1997 | ............ C09D/5/04 |
| WO | WO9903595 | 1/1999 | |

OTHER PUBLICATIONS

English Abstract for EP 0302240.
Section Ch. Week 199418, Derwent Publication Ltd., London, GB; Class A14, AN 1994–148117 XP002156546.
English Abstract on Front page of the International Publication for WO94/22968.
USSN 08/513,925, BASF Lacke + Farben AG, entitled Nonaqueous coating and process for producing a two–coat finish, filed Sep. 28, 1995, p. 1–22.
Calbo, L.J., Handbook of Coatings Additives, vol. 2, 1992, Marcel Dekker, Inc., pp. 105–109 and 129–130.
Notice of Opposition from corresponding EP1218460.

* cited by examiner

*Primary Examiner*—Patrick D. Niland

(57) ABSTRACT

Use of associative thickeners based on polyurethane and/or dipropylene glycol monoalkyl ethers for suppressing defects in color and/or effect multicoat paint systems, or their touch-up paints.

18 Claims, No Drawings

USE OF ASSOCIATIVE THICKENERS BASED ON POLYURETHANE AND/OR DIPROPYLENE GLYCOL MONOALKYL ETHERS IN COLORED AND/OR DECORATIVE EFFECT MULTI-LAYERED LACQUERS

This application is a National Phase Application of Patent Application PCT/EP00/08503 filed on 31 Aug. 2000.

The present invention relates to the use of polyurethane-based associative thickeners and/or dipropylene glycol monoalkyl ethers to suppress optical defects in multicoat color and/or effect paint systems or their refinishes. The present invention also relates to novel aqueous basecoat materials which comprise at least one polyurethane-based associative thickener and/or at least one dipropylene glycol monoalkyl ether. The present invention further relates to the use of the novel aqueous basecoat materials for producing multicoat color and/or effect paint systems and their refinishes.

Owing to their numerous advantageous properties, multicoat color and/or effect paint systems are nowadays employed in many fields, examples being the coating of motor vehicle bodies, industrial components, including electrical components, coils, and packaging, and fabrics or furniture. Owing to the particularly stringent requirements on the part of automakers and their customers, these multicoat color and/or effect paint systems have become established in particular in this field of use.

As is known, the bodies of automobiles are nowadays coated with a multicoat paint system composed of a primer, particularly an electrocoat, a surfacer or an antistonechip primer, and a multicoat color and/or effect paint system. The multicoat paint system itself is generally composed of at least one basecoat and at least one clearcoat. Advantageously, the basecoat is produced from an aqueous basecoat material. In accordance with the particularly advantageous wet-on-wet technique, the aqueous basecoat material is applied to the surfacer or the antistonechip primer and partly dried, but not crosslinked. Thereafter, at least one clearcoat film is applied to the uncured aqueous basecoat film and is cured together with the aqueous basecoat film. This technique is also employed for the refinish of the multicoat color and/or effect paint systems.

Both during the production of the multicoat color and/or effect paint systems and during the refinish of defects present therein, optical defects can occur which are manifested to disruptive effect and which give cause for complaints. These optical defects may have a variety of causes.

Accordingly, defects in the surfacer or in the antistonechip primer are normally removed by abrading. When this is done, abrasion dust residues in the form of fingerprints or, in the case of wet abrasion, in the form of dried water droplets can remain. After overcoating with aqueous basecoat and clearcoat material, these "fingerprints" and/or "droplets" show up as light-colored, clearly visible sites in the resulting multicoat color and/or effect paint system. These optical defects are also referred to by the skilled worker as "light spots".

Optical defects of this kind also arise if the clearcoat of a multicoat color and/or effect paint system is abraded for purposes of better adhesion of a refinish that is to be applied. These optical defects are also referred to by the skilled worker as "abrasion spots".

These pale spots are not abrasion scars which are poorly covered, but may instead be induced even by beads of sweat or the sweat on the fingers.

Another kind of optical defect, known as polishing spots, results if the finished multicoat color and/or effect paint system is polished at damaged sites, but then, owing to further damaged sites, has to be subjected to a complete refinish, with the polished sites as well being overcoated. In the refinish, these polishing sites are very clearly visible owing to their different shade.

To date it has been possible to prevent these optical defects only by extremely careful and cautious working and a high additional cleaning effort, since the aqueous basecoat materials available at present do not have the sufficient insensitivity to such defects in and on the surfacers and/or in and on the multicoat color and/or effect paint systems, and are therefore unable, or unable sufficiently, to compensate these defects optically. This fact, however, leads to relatively long processing times and thus to higher costs in line finishing or in line or workshop refinish.

There is therefore a high demand for basecoat materials, especially aqueous basecoat materials, which no longer have these disadvantages but Instead provide optical compensation of the defects while retaining all of their other advantageous properties, if not indeed improving upon them.

Aqueous basecoat materials which are outstandingly suitable for producing color and/or effect paint systems are known, for example, from the German patent application DE-A-44 37 535. They comprise an inorganic thickener, such as a phyllosilicate, and organic solvents, such as butyl glycol. As binders they comprise water-soluble or -dispersible polyurethanes, water-soluble or -dispersible polyacrylate resins prepared in the presence of such polyurethanes, and 3water-soluble or -dispersible polyesters. They have a very high storage stability even at relatively high temperatures. The use of polyurethane-based associative thickeners and/or dipropylene glycol monoalkyl ethers is not disclosed by DE-A-44 37 535.

Polyurethane-based associative thickeners and their performance properties and advantages are known. By way of example, reference may be made here to Römpp Lexikon Lacke und Druckfarben, Georg Thieme Verlag, Stuttgart, N.Y., 1998, "thickeners", pages 599 to 600, and the textbook "Lackadditive" [Additives for Coatings] by Johan Bieleman, Wiley-VCH, Weinheim, N.Y., 1998, pages 51 to 59 and 65. The use of these polyurethane-based associative thickeners for suppressing optical defects in multicoat color and/or effect paint systems and their refinishes are not described therein.

It is an object of the present invention to [lacuna] novel basecoat materials, especially the aqueous basecoat materials, which comprise novel combinations of constituents and which allow the production and refinish of multicoat color and/or effect paint systems without the formation of light spots or polishing spots. The novel basecoat materials, particularly the novel aqueous basecoat materials, ought to continue to have the particular advantages of the existing basecoat materials or to exhibit additional, novel advantageous properties.

Found accordingly was the novel use of polyurethane-based associative thickeners and/or dipropylene glycol monoalkyl ethers for suppressing optical defects in multicoat color and/or effect paint systems and their refinishes.

In the text below, this novel use is referred to as "inventive use".

Additionally found was the novel aqueous basecoat material which comprises (A) at least one water-soluble or -dispersible polyurethane, (B) at least one crosslinking agent, (C) at least one color and/or effect pigment,
(D) at least one neutralizing agent,
(E) at least one inorganic thickener, and
(F) at least one dipropylene glycol monoalkyl ether.

Additionally found was the further novel aqueous basecoat material which comprises
(A) at least one water-soluble or -dispersible polyurethane,
(B) at least one crosslinking agent,
(C) at least one color and/or effect pigment,
(D) at least one neutralizing agent,
(E) at least one inorganic thickener,
(G) at least one polyurethane-based associative thickener,
(H) if desired, at least one water-soluble or -dispersible polyacrylate resin prepared in the presence of a water-soluble or -dispersible polyurethane, and
(I) at least one water-soluble or -dispersible polyester resin.

In the text below, these novel aqueous basecoat materials are referred to collectively as "aqueous basecoat materials of the invention".

Found not least were the novel multicoat color and/or effect paint systems which comprises at least one basecoat producible from one of the aqueous basecoat materials of the invention.

In the light of the prior art it was surprising and unforeseeable for the skilled worker that the object of the present invention could be achieved by means of the inventive use. Even more surprising was that the achievement of the object was demonstrably not based on the Theological properties of the aqueous basecoat materials of the invention, which in this respect are equivalent to the known aqueous basecoat materials. Moreover, it could not at all have been expected that the durable suppression or prevention of polishing spots could be achieved by the combination of the polyurethane-based associative thickener (G) for inventive use and at least one dipropylene glycol monoalkyl ether (F).

In accordance with the invention, the polyurethane-based associative thickener (G) or the dipropylene glycol monoalkyl ether (F) can be employed alone, with the use alone of the associative thickener (G) offering particular advantages and therefore being preferred in accordance with the invention very particular advantages result, however, from the joint use of the two constituents, which is therefore particularly preferred in accordance with the invention.

The first inventively essential constituent of the aqueous basecoat materials of the invention is therefore at least one polyurethane-based associative thickener (G). These thickeners are normally composed of nonionic hydrophobic polymers which are available either in liquid form, as a 50 percent strength solution in water or in organic solvents, for example, or in powder form. They are based on water-soluble polyurethanes having a comparatively low molecular weight of from 10 000 to 50 000.

The water-soluble polyurethanes (G) are prepared by reacting diisocyanates, especially the diisocyanates described below, with diols, especially the diols described below, and hydrophobic blocking components, thereby resulting in the following idealized structure of the general formula I.

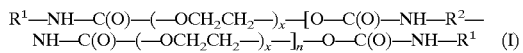

In the general formula I, the indices x and n stand for integers whose value is sufficient to give the molecular weights indicated above.

The radical $R^1$ stands for a hydrophobic aliphatic or aromatic group. Examples of suitable groups of this kind are oleyl, stearyl, dodecylphenyl or nonylphenyl.

The radical $R^2$ stands for a hydrophilic segment. Examples of suitable hydrophilic segments are polyesters, especially polyesters of maleic acid and ethylene glycol, and polyethers, especially polyethylene glycol or its derivatives.

The polyurethane-based associative thickeners for inventive use therefore contain the three following kinds of segments or building-block groups:
hydrophobic end segments,
two or more hydrophilic segments, and
urethane groups.

These segments or building-block groups can be linked to one another in a very wide variety of ways, so resulting in a very wide variety of polymer structures. In accordance with the invention, however, advantageous associative thickeners are those which contain linear and comb-shaped polymer structures. It is essential that each polymer molecule contains at least two hydrophobic end segments.

For the preparation of the aqueous basecoat materials of the invention, the associative thickeners (G) for inventive use are employed as powders or, preferably, as 20 to 30% strength by weight solutions in at least one water-dilutable solvent.

In the aqueous basecoat materials of the invention they are advantageously present in an amount of from 0.1 to 4.0%, preferably from 0.4 to 3.5%, and in particular from 0.4 to 3.0% by weight, based in each case on the overall weight of the respective aqueous basecoat material.

Dipropylene glycol monoalkyl ethers are compounds which are known per se and are employed in the coatings field as solvents or as solvent additions. Examples of suitable alkyl radicals in this context are methyl, propyl, isopropyl, n-butyl, n-pentyl or n-hexyl, of which the methyl radical is particularly advantageous and is therefore used with particular preference.

The dipropylene glycol methyl ether (F) used with particular preference is a compound known per se or a mixture known per se, both of which are available commercially. It is derived from dipropylene glycol, 1,1'-oxybis-(2-propanol), and/or isomers thereof.

In the aqueous basecoat materials of the invention, the dipropylene glycol monoalkyl ethers (F) are present advantageously in an amount of from 0.5 to 11%, preferably from 1.0 to 9%, and in particular from 1.0 to 7.0% by weight, based in each case on the overall weight of the respective aqueous basecoat material.

The other essential constituent of the aqueous basecoat materials of the invention is at least one water-soluble or -dispersible polyurethane (A). Polyurethanes (A) and processes for preparing them are known per se and are described, for example, in the German patent DE-A-44 37 535.

Advantageously, depending on the nature of the stabilization, the polyurethane (A) for inventive use has an acid number or amine number of from 10 to 250 mg KOH/g (ionic stabilization or nonionic plus ionic stabilization) or from 0 to 10 mg KOH/g (nonionic stabilization), an OH number of from 30 to 350 mg KOH/g, and a number-average molecular weight of from 1 500 to 55 000 daltons.

For the preparation of the polyurethanes (A) it is conventional to use diisocyanates and also, if desired and in minor amounts, polyisocyanates, for the purpose of introducing branches. In the context of the present invention, minor amounts are amounts which do not cause gelling of the polyurethanes (A) during their preparation. This may also be prevented by using small amounts of monoisocyanates as well.

Examples of suitable diisocyanates are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)-cyclohexane, 1-isocyanato-2-(3-isocyanatoeth-1-yl)-cyclohexane, 1-isocyanato-2-(4-isocyanatobut-1-yl)-cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptanemethylene diisocyanate or diisocyanates derived from dimeric fatty acids, as marketed under the commercial designation DDI 1410 by the company Henkel and described in patents DO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl) cyclohexane, liquid bis(4-isocyanatocyclohexyl)methane with a trans/trans content of up to 30% by weight, preferably 25% by weight, and in particular 20% by weight, as is described in patents DE-A-44 14 032, GB-A-1 220 717, DE-A-16 18 795 or DE-A-17 93 785; tolylene diisocyanate, xylylene diisocyanate, bisphenylene diisocyanate, naphthylene diisocyanate or diphenylmethane diisocyanate.

Examples of suitable polyisocyanates are the isocyanurates of the diisocyanates described above.

Examples of highly suitable monoisocyanates are phenyl isocyanate, cyclohexyl isocyanate or stearyl isocyanate.

The polyurethanes (A) for inventive use are also prepared using
- saturated and unsaturated polyols of relatively high and low molecular mass, especially diols and, in minor amounts, triols for the purpose of introducing branches,
- polyamines,
- amino alcohols, and
- compounds which introduce stabilizing (potentially) ionic and/or nonionic functional groups.

Examples of suitable polyols are saturated or olefinically unsaturated polyester polyols which are prepared by reacting
- unsulfonated or sulfonated saturated and/or unsaturated polycarboxylic acids or their esterifiable derivatives, alone or together with monocarboxylic acids, and
- saturated and/or unsaturated polyols, alone or together with monools.

Examples of suitable polycarboxylic acids are aromatic, aliphatic and cycloaliphatic polycarboxylic acids. Preference is given to the use of aromatic and/or aliphatic polycarboxylic acids.

Examples of suitable aromatic polycarboxylic acids are phthalic acid, isophthalic acid, terephthalic acid, phthalic, isophthalic or terephthalic acid monosulfonate, or halophthalic acids, such as tetrachlorophthalic or tetrabromophthalic acid, among which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid or dodecanedicarboxylic acid, or dimeric fatty acids, or maleic acid, fumaric acid or itaconic acid, of which adipic acid, glutaric acid, azelaic acid, sebacic acid, dimeric fatty acids and maleic acid are advantageous and are therefore used with preference.

Examples of suitable cycloaliphatic and cyclic unsaturated polycarboxylic acids are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid or 4-methyltetrahydrophthalic acid. These dicarboxylic acids may be used both in their cis and in their trans form and also as a mixture of both forms.

Also suitable are the esterifiable derivatives of the abovementioned polycarboxylic acids, such as their monoesters or polyesters with aliphatic alcohols having 1 to 4 carbon atoms or hydroxy alcohols having 1 to 4 carbon atoms, for example. It is also possible to use the anhydrides of the abovementioned polycarboxylic acids, where they exist.

Together with the polycarboxylic acids it is also possible if desired to use monocarboxylic acids, such as, for example, benzoic acid, tert-butylbenzoic acid, lauric acid, isononanoic acid, fatty acids of naturally occurring oils, acrylic acid, methacrylic acid, ethacrylic acid or crotonic acid. The preferred monocarboxylic acid used is isononanoic acid.

Examples of suitable polyols are diols and triols, especially diols. Normally, triols are used alongside the diols in minor amounts in order to introduce branches into the polyester polyols. In the context of the present invention, minor amounts are amounts which do not cause gelling of the polyester polyols during their preparation.

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol or the positionally isomeric diethyloctanediols. These diols may also be used per se for the preparation of the polyurethanes (A) for inventive use.

Further examples of suitable diols are diols of the formula I or II:

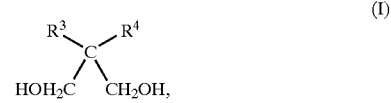

(I)

where $R^3$ and $R^4$ are each an identical or different radical and are an alkyl radical having 1 to 18 carbon atoms, an aryl radical or a cycloaliphatic radical, with the proviso that $R^3$ and/or $R^4$ must not be methyl;

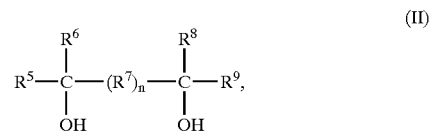

(II)

where $R^5$, $R^6$, $R^8$ and $R^9$ are each identical or different radicals and are an alkyl radical having 1 to 6 carbon atoms, a cycloalkyl radical or an aryl radical and $R^7$ is an alkyl radical having 1 to 6 carbon atoms, an aryl radical or an unsaturated alkyl radical having 1 to 6 carbon atoms, and n is either 0 or 1.

Suitable diols I of the general formula I are all propanediols of the formula in which either $R^3$ or $R^4$, or $R^3$ and $R^4$, is or are not methyl, such as, for example, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1]heptane, 2,2-diethyl-1,3-propanediol, 2,2-dipropyl-1,3-propanediol or 2-cyclo-hexyl-2-methyl-1,3-propanediol, et cetera.

Examples of diols II of the general formula II that may be used are 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-(2'-hydroxypropyl)benzene and 1,3-(2'-hydroxypropyl)benzene.

Of these diols, hexanediol and neopentyl glycol are particularly advantageous and are therefore used with particular preference.

The abovementioned diols may also be used per se to prepare the polyurethanes (A) for inventive use.

Examples of suitable triols are trimethylolethane, trimethylolpropane or glycerol, especially trimethylolpropane.

The abovementioned triols may also be used per se to prepare the polyurethanes (A) for inventive use (cf. the patent EP-A-0 339 433).

If desired, minor amounts of monools may also be used. Examples of suitable monools are alcohols or phenols such as ethanol, propanol, n-butanol, sec-butanol, tert-butanol, amyl alcohols, hexanols, fatty alcohols, allyl alcohol, or phenol.

The polyester polyols may be prepared in the presence of small amounts of a suitable solvent as entrainer. Examples of entrainers used are aromatic hydrocarbons, such as especially xylene and (cyclo)aliphatic hydrocarbons, e.g., cyclohexane or methylcyclohexane.

Further examples of suitable polyols are polyester diols which are obtained by reacting a lactone with a diol. They are notable for the presence of terminal hydroxyl groups and repeating polyester fractions of the formula —(—CO—(CHR$^{10}$)$_m$—CH$_2$—O—)—. Here, the index m is preferably from 4 to 6 and the substituent $R^{10}$ is hydrogen or an alkyl, cycloalkyl, or alkoxy radical. No substituent contains more than 12 carbon atoms. The total number of carbon atoms in the substituent does not exceed 12 per lactone ring. Examples are hydroxycaproic acid, hydroxybutyric acid, hydroxydecanoic acid, and/or hydroxystearic acid.

Preferred for the preparation of the polyester diols is the unsubstituted ###-caprolactone, where m is 4 and all $R^{10}$ substituents are hydrogen. The reaction with lactone is started by low molecular mass polyols such as ethylene glycol, 1,3-propanediol, 1,4-butanediol, or dimethylolcyclohexane. It is also possible, however, to react other reaction components, such as ethylenediamine, alkyldialkanolamines, or else urea, with caprolactone. Other suitable diols of relatively high molecular mass are polylactam diols, which are prepared by reacting, for example, ###-caprolactam with low molecular mass diols.

Further examples of suitable polyols include polyether polyols, especially those having a number-average molecular weight of from 400 to 5 000, in particular from 400 to 3 000. Examples of highly suitable polyether diols are polyether diols of the general formula H—(—O—(CHR$^{11}$)$_o$—)$_p$OH, where the substituent $R^{11}$ is hydrogen or a lower, unsubstituted or substitued alkyl radical, the index o is from 2 to 6, preferably from 3 to 4, and the index p is from 2 to 100, preferably from 5 to 50. Especially suitable examples are linear or branched polyether diols such as poly (oxyethylene) glycols, poly(oxypropylene) glycols, and poly (oxybutylene) glycols.

The polyether diols ought on the one hand not to introduce excessive amounts of ether groups, since otherwise the polyurethanes (A) for inventive use that are formed start to swell in water. On the other hand, they can be used in amounts which ensures the nonionic stabilization of the polyurethanes (A). In that case they serve as the functional nonionic groups (a3) described below.

The polyurethane (A) for inventive use comprises alternatively (a1) functional groups convertible into cations by neutralizing agents and/or quaternizing agents, and/or cationic groups, especially ammonium groups, or (a2) functional groups convertible into anions by neutralizing agents, and/or anionic groups, especially carboxylic acid and/or carboxylate groups, and/or (a3) nonionic hydrophilic groups, especially poly (alkylene ether) groups.

Examples of suitable functional groups (a1) for inventive use and convertible into cations by neutralizing agents (D) and/or quaternizing agents are primary, secondary or tertiary amino groups, secondary sulfide groups or tertiary phosphine groups, especially tertiary amino groups or secondary sulfide groups.

Examples of suitable cationic groups (a1) for inventive use are primary, secondary, tertiary or quaternary ammonium groups, tertiary sulfonium groups or quaternary phosphonium groups, preferably quaternary ammonium groups or quaternary ammonium groups, tertiary sulfonium groups, but especially tertiary sulfonium groups.

Examples of suitable functional groups (a2) for inventive use and convertible into anions by neutralizing agents (D) are carboxylic acid, sulfonic acid or phosphonic acid groups, especially carboxylic acid groups.

Examples of suitable anionic groups (a2) for inventive use are carboxylate, sulfonate or phosphonate groups, especially carboxylate groups.

Examples of suitable neutralizing agents (D) for functional groups (a1) convertible into cations are organic and inorganic acids such as formic acid, acetic acid, lactic acid, dimethylolpropionic acid, citric acid, sulfuric acid, hydrochloric acid or phosphoric acid.

Examples of suitable neutralizing agents (D) for functional groups (a2) convertible into anions are tertiary amines, such as trimethylamine, triethylamine, tributylamine, dimethylaniline, diethylaniline, triphenylamine, dimethylethanolamine, diethylethanolamine, methyldiethanolamine or triethanolamine, for example. Neutralization may take place in organic phase or in aqueous phase. A preferred neutralizing agent used is dimethylethanolamine.

The total amount of neutralizing agent (D) used in the aqueous basecoat material of the invention is chosen so that from 1 to 100 equivalents, preferably from 50 to 90 equivalents, of the functional groups (a1) or (a2) of the polyurethane (A) for inventive use are neutralized.

Of these functional (potentially) ionic groups (a1) and (a2) and functional nonionic groups (a3), the (potentially) anionic groups (a2) are advantageous and are therefore used with particular preference.

The introduction of (potentially) anionic groups (a2) into the polyurethane molecules takes place by way of the incorporation of compounds which contain in the molecule at least one isocyanate-reactive group and at least one group capable of forming anions; the amount to be used may be calculated from the target acid number.

Examples of suitable compounds of this kind are those containing two isocyanate-reactive groups in the molecule. Suitable isocyanate-reactive groups are, in particular, hydroxyl groups, and also primary and/or secondary amino groups. Accordingly it is possible, for example, to use alkanoic acids having two substituents on the ###-positioned carbon atom. The substituent may be a hydroxyl group, an alkyl group, or, preferably, an alkylol group. These alkanoic acids have at least one, generally from 1 to 3, carboxyl groups in the molecule. They have 2 to about 25, preferably 3 to 10, carbon atoms. Examples of suitable alkanoic acids are dihydroxypropionic acid, dihydroxysuccinic acid, and dihydroxybenzoic acid. A particularly preferred group of alkanoic acids are the ###,###-dimethylolalkanoic acids of the general formula $R^{12}$—C(CH$_2$OH)$_2$COOH, $R^{12}$ being a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid, and 2,2-dimenthylolpentanoic acid. The preferred dihydroxyalkanoic acid is 2,2-dimethylolpropionic acid. Examples of compounds containing amino groups are ###, ###-diaminovaleric acid, 3,4-diaminobenzoic acid, 2,4-diaminotoluenesulfonic acid, and 2,4-diaminodiphenyl ether sulfonic acid.

Stabilizing nonionic poly(oxyalkylene) groups (a3) may be introduced as lateral or terminal groups into the polyurethane molecules. For this purpose it is possible to use, for example, alkoxypoly(oxyalkylene) alcohols having the general formula $R^{13}O$—(—CH$_2$—CHR$^{14}$—O—)$_r$H, where $R^{13}$ is an alkyl radical having 1 to 6 carbon atoms, $R^{14}$ is a hydrogen atom or an alkyl radical having 1 to 6 carbon atoms, and the index r is a number between 20 and 75. (cf. the patents EP-A-0 354 261 or EP-A-0 424 705).

The use of polyols, polyamines and amino alcohols leads to an increase in the molecular weight of the polyarethanes (A).

Suitable polyols for the chain extension are polyols containing up to 36 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di-trimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A or mixtures thereof (cf. patents EP-A-0 339 433, EP-A-0 436 941, EP-A-0 517 707).

Examples of suitable polyamines have at least two primary and/or secondary amino groups. Polyamines are essentially alkylene polyamines having 1 to 40 carbon atoms, preferably about 2 to 15 carbon atoms. They may carry substituents which have no hydrogen atoms that are reactive with isocyanate groups. Examples are polyamines having a linear or branched aliphatic, cycloaliphatic or aromatic structure and at least two primary amino groups.

Diamines include hydrazine, ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine, 4,4'-diaminodicyclohexylmethane, and aminoethylenothanolamine. Preferred diamines are hydrazine, alkyl- or cycloalkyldiamines such as propylenediamine and 1-amino-3-aminomethyl-3,5,5-trimethylcyclohexane.

It is also possible to use polyamines containing more than two amino groups in the molecule. In these cases, however, it should be ensured—for example, by using monoamines as well—that no crosslinked polyurethane resins are obtained. Polyamines of this kind which may be used are diethylenetriamine, triethylenetetramine, dipropylenediamine, and dibutylenetriamine. An example of a monoamine is ethylhexylamine (cf. the patent BP-A-0 089 497).

Examples of suitable amino alcohols are ethanolamine or diethanolamine.

In the aqueous basecoat materials of the invention, the polyurethanes (A) are present advantageously in an amount of from 1.0 to 50%, preferably from 2.0 to 40%, with particular preference from 3.0 to 30%, with very particular preference from 4.0 to 25%, and in particular from 5.0 to 20% by weight, based in each case on the overall weight of the respective aqueous basecoat material of the invention.

The further essential constituent of the coating material of the invention is at least one crosslinking agent (B).

Examples of suitable crosslinking agents (B) are amino is resins, compounds or resins containing anhydride groups, compounds or resins containing epoxide groups, trig(alkoxycarbonylamino)triazines, compounds or resins containing carbonate groups, blocked and/or nonblocked polyisocyanates, beta-hydroxyalkylamides, and compounds containing on average at least two groups capable of transesterification, examples being reaction products of malonic diesters and polyisocyanates or of esters and partial esters of polyhydric alcohols of malonic acid with monoisocyanates, as described by the European patent EP-A-0 596 460.

Crosslinking agents of this kind are well known to the skilled worker and are offered by numerous companies as sales products.

Examples of suitable polyepoxides are, in particular, all known aliphatic and/or cycloaliphatic and/or aromatic polyepoxides, based for example on bisphenol A or bisphenol P. Examples of suitable polyepoxides also include the polyepoxides available commercially under the designations Epikote® from Shell, Denacol® from Nagase Chemicals Ltd., Japan, such as, for example, Denacol EX-411 (pentaerythritol polyglycidyl ether), Denacol EX-321 (trimethylolpropane polyglycidyl ether), Denacol® EX-512 (polyglycerol polyglycidyl ether) and Denacol® EX-521 (polyglycerol polyglycidyl ether).

The suitable tris(alkoxycarbonylamino)triazines had the following formula:

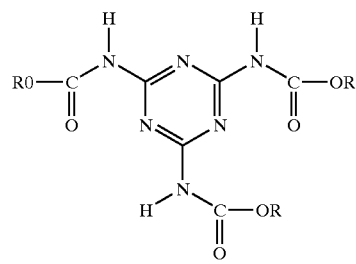

Examples of suitable tris(alkoxycarbonylamino)triazines are described in the patents U.S. Pat. No. 4,939,213, U.S.

Pat. No. 5,084,541 or EP-A-0 624 577. Use is made in particular of the tris(methoxy-, tris(butoxy- and/or tris(2-ethylhexoxycarbonylamino)triazines.

Of advantage are the methyl butyl mixed esters, the butyl 2-ethylhexyl mixed esters and the butyl esters. These have the advantage over the straight methyl ester of better solubility in polymer melts, and also have less of a tendency to crystallize.

An example of a suitable polyanhydride is polysuccinic anhydride.

Examples of suitable beta-hydroxyalkylamides are N,N,N',N'-tetrakis(2-hydroxyethyl)adipamide or N,N,N',N'-tetrakis(2-hydroxypropyl)adipamide.

Further examples of suitable crosslinking agents are the blocked polyisocyanates.

Examples of suitable blocking agents are the blocking agents known from the U.S. Pat. No. 4,444,954:

i) phenols such as phenol, cresol, xylenol, nitrophenol, chlorophenol, ethylphenol, t-butylphenol, hydroxybenzoic acid, esters of this acid or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, ketoximes, imidazoles or triazoles; and also xvii) mixtures of these blocking agents, especially dimethylpyrazole and triazoles, malonates and acetoacetates or dimethylpyrazole and succinimide.

Examples of suitable organic polyisocyanates for blocking are in particular the polyisocyanates known as paint polyisocyanates, containing aliphatically, cycloaliphatically, araliphatically and/or aromatically bonded isocyanate groups. Preference is given to polyisocyanates containing from 2 to 5 isocyanate groups per molecule and having viscosities of from 100 to 10 000, preferably from 100 to 5 000. Furthermore, the polyisocyanates can have been hydrophilically or hydrophobically modified in a customary and known way.

Further examples of suitable polyisocyanates for blocking are described in "Methoden der organischen Chemie", Houben-Weyl, Volume 14/2, $4^{th}$ edition, Georg Thieme Verlag, Stuttgart 1963, page 61 to 70, and by W. Siefken, Liebigs Annalen der Chemie, Volume 562, pages 75 to 136. Suitable examples include the polyurethane prepolymers containing isocyanate groups, which can be prepared by reacting polyols with an excess of polyisocyanates and which are preferably of low viscosity.

Further examples of suitable polyisocyanates for blocking are polyisocyanates containing isocyanurate, biuret, allophanate, iminooxadiazinedione, urethane, urea and/or uretdione groups. Polyisocyanates containing urethane groups, for example, are obtained by reacting some of the isocyanate groups with polyols, such as trimethylolpropane and glycerol, for example. It is preferred to use aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate, dicyclohexylmethane 4,4'-diisocyanate, diisocyanates derived from dimeric fatty acids, as marketed under the commercial designation DDI 1410 by the company Henkel and described in the patents DO 97/49745 and WO 97/49747, especially 2-heptyl-3,4-bis(9-isocyanatononyl)-1-pentylcyclohexane; or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, 1,8-diisocyanato-4-isocyanatomethyloctane, 1,7-diisocyanato-4-isocyanatomethylheptane or 1-isocyanato-2-(3-isocyanatopropyl)cyclohexane, or mixtures of these polyisocyanates.

Very particular preference is given to using mixtures of polyisocyanurates which contain uretdione and/or isocyanurate groups and/or allophanate groups that are based on hexamethylene diisocyanate, as formed by catalytic oligomerization of hexamethylene diisocyanate using appropriate catalysts.

In particular it is possible to use amino resins, examples being melamine resins, guanamine resins or urea resins, as crosslinking agents (B). In this case it is possible to use any amino resin which is suitable for transparent topcoat materials or clearcoat materials, or a mixture of such amino resins. For further details refer to Römpp Lexikon Lacke und Druckfarben, Georg Thieme Verlag, 1998, page 29, "Amino resins", and the textbook "Lackadditive" by Johan Bieleman, Wiley-VCH, Weinheim, N.Y., 1998, pages 242 ff., or to the book "Paints, Coatings and Solvents", second completely revised edition, Editors D. Stoye and W. Freitag, Wiley-VCH, Weinheim, N.Y., 1998, pages 80 ff. Also suitable are the customary and known amino resins some of whose methylol and/or methoxymethyl groups have been defunctionalized by means of carbanate or allophanate groups. Crosslinking agents of this kind are described in patents U.S. Pat. No. 4,710,542 and EP-B-0 245 700 and also in the article by B. Singh and coworkers, "Carbamyl-methylated Melamines, Novel Croselinkers for the Coatings Industry" in Advanced Organic Coatings Science and Technology Series, 1991, Volume 13, pages 193 to 207.

Preferably, the amino resins are contained in the aqueous basecoat materials of the invention as the predominant or sole crosslinking agents (B). The other abovementioned crosslinking agents (B) can be used as additional crosslinking agents (B) for the further advantageous variation of the profile of properties of the aqueous basecoat materials of the invention and of the inventive basecoats and inventive multicoat color and/or effect paint systems produced from them, their proportion among the crosslinking agents (B) in that case being <50% by weight.

In the aqueous basecoat materials of the invention, the crosslinking agents (B) are employed preferably in an amount of from 0.1 to 30%, more preferably from 0.3 to 20%, with particular preference from 0.5 to 10%, and in particular from 1.0 to 8.0% by weight, based in each case on the overall weight of the respective aqueous basecoat material of the invention.

Yet another essential constituent of the aqueous basecoat material of the invention is at least one color and/or effect pigment (C). The pigments (C) can be composed of organic or inorganic compounds. The aqueous basecoat material of the invention therefore ensures, owing to this large number of suitable pigments, a universal breadth of use, and permits the realization of a large number of color shades and optical effects.

As effect pigments (C) it is possible to use metal flake pigments such as commercial aluminum bronzes, aluminum bronzes chromated as per DE-A-36 36 183, commercial stainless steel bronzes, and nonmetallic effect pigments, such as pearlescent pigments and interference pigments, for example. For further details refer to Römpp Lexikon Lacke und Druckfarben, Georg Thieme Verlag, 1998, pages 176, "Effect pigments" and pages 380 and 381, "Metal oxide/ mica pigments" to "Metal pigments".

Examples of suitable inorganic color pigments (C) are titanium dioxide, iron oxides, Sicotrans yellow, and carbon black. Examples of suitable organic color pigments (C) are thioindigo pigments indanthrene blue, Cromophthal red, Irgazine orange and Heliogen green. For further details refer to Römpp Lexikon Lacke und Druckfarben, Georg Thieme Verlag, 1998, pages 180 and 181, "Iron blue pigments" to "Black iron oxide", pages 451 to 453, "Pigments" to "Pigment volume concentration", page 563 "Thioindigo pigments" and page 567 "Titanium dioxide pigments".

The fraction of the pigments (C) in the aqueous basecoat material of the invention can vary extremely widely and is guided primarily by the opacity of the pigments (C), by the desired shade and by the desired optical effect. In the aqueous basecoat material of the invention, the pigments (C) are present in an amount of preferably from 0.5 to 50%, more preferably from 0.5 to 45%, with particular preference from 0.5 to 40%, with very particular preference from 0.5 to 35%, and in particular from 0.5 to 30% by weight, based in each case on the overall weight of the aqueous basecoat material of the invention. The pigment/binder ratio, i.e., the ratio of the pigments (C) to the above-described polyurethanes (A) or to the polyurethanes (A) and the hereinbelow-described polyacrylate resins (H) and polyesters (I), can also vary extremely widely. This ratio is preferably from 4.0:1.0 to 1.0:50, more preferably from 3.5:1.0 to 1.0:50, with particular preference from 3.0:1.0 to 1.0:40, with very particular preference from 2.5:1.0 to 1.0:30, and in particular from 2.3:1.0 to 1.0:25.

These pigments (C) may also be incorporated into the aqueous basecoat materials of the invention by way of pigment pastes, in which case suitable dispersing resins include the above-described polyurethanes (A) and/or the hereinbelow-described polyacrylate resins (H) and/or polyester resins (I).

Yet another essential constituent of the aqueous basecoat material of the invention is at least one inorganic thickener (E).

Examples of suitable inorganic thickeners (E) are inorganic phyllosilicates, preferably smectites, especially montmorillonites and hectorites, such as aluminum magnesium silicates, sodium magnesium and sodium magnesium fluorine lithium phyllosilicates of the montmorillonite type or inorganic phyllosilicates such as aluminum magnesium silicates, aluminum magnesium silicates, sodium magnesium and sodium magnesium fluorine lithium phyllosilicates of the montmorillonite type. For further details, refer to the book by Johan Bielemann "Lackadditive", Wiley-VCH, Weinheim, N.Y., 1998, pages 17 to 30.

In the aqueous basecoat materials of the invention, the thickeners (E) are present preferably in an amount of from 0.01 to 5.0%, more preferably from 0.05 to 3.0%, with particular preference from 0.1 to 2.5%, with very particular preference from 0.2 to 2.0%, and in particular from 0.3 to 1.5% by weight, based in each case on the overall weight of the aqueous basecoat material of the invention.

In one preferred embodiment of the aqueous basecoat material of the invention, it comprises in addition to the polyurethanes (A) at least one water-soluble or -dispersible polyacrylate resin (H) prepared in the presence of a water-soluble or -dispersible polyurethane.

Examples of suitable polyurethanes in whose presence the polyacrylate resin (H) is prepared contain olefinically unsaturated groups which are lateral, terminal and/or located within the main polymer chain, or contain no olefinically unsaturated groups. Examples of highly suitable polyurethanes of this kind are known from the patents EP-A-0 521 928, EP-A-0 522 420, EP-A-0 522 419 or EP-A-0 730 613 (olefinically unsaturated) or DE-A-44 37 535 (saturated). Examples of especially suitable polyurethanes are the above-described polyurethanes (A), especially the polyurethanes (A) containing carboxylic acid groups and/or carboxylate groups.

Accordingly, the polyacrylate resins (H) which contain carboxylic acid groups and/or carboxylate groups as solubilizing or dispersing groups are of advantage in accordance with the invention and are therefore used with preference. As regards the neutralization of the polyacrylate resins (H), the comments made above in relation to the polyurethanes (A) apply analogously.

In accordance with the invention it is of advantage to prepare the polyacrylate resins (H) in the presence of saturated polyurethanes (A), and so this variant is particularly preferred.

Very particularly highly suitable polyacrylate resins (H) are obtained by copolymerizing the olefinically unsaturated monomers (h) described below, of which at least one contains at least one carboxylic acid group and preferably at least one contains at least one hydroxyl group and is substantially free from acid groups.

Examples of suitable monomers (h) are:

Monomers (h1):

Hydroxyalkyl eaters of acrylic acid, methacrylic acid of another alpha,beta-ethylenically unsaturated carboxylic acid which are derived from an alkylene glycol which is esterified with the acid, or are obtainable by reacting the acid with an alkylene oxide, especially hydroxyalkyl esters of acrylic acid, methacrylic acid or ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate or crotonate; 1,4-bis(hydroxymethyl) cyclohexane, octahydro-4,7-methano-1H-indenedimethanol or methylpropanediol monoacrylate, monomethacrylate, monoethacrylate or monocrotonate; or reaction products of cyclic esters, such as epsiloncaprolactone, for example, and these hydroxyalkyl esters; or olefinically unsaturated alcohols such as allyl alcohol or polyols such as trimethylolpropane monoallyl or diallyl ether or pentaerythritol monoallyl, diallyl or triallyl ether. These monomers (h1) of higher functionality are generally used only in minor amounts. In the context of the present invention, minor amounts of higher-functional monomers here are amounts which do not result in the crosslinking or gelling of the polyacrylate resins. Thus, for example, the proportion of trimethylolpropane monoallyl ether may be from 2 to 10% by weight, based on the overall weight of the monomers (h1) to (h6) used to prepare the polyacrylate resin. In addition, however, it is also possible to add from 2 to 10% by weight, based on the overall weight of the monomers (h) used to prepare the polyacrylate resin, of trimethylolpropane monoallyl ether to the finished polyacrylate resin. Although the olefinically unsaturated polyols (h1) can be used as the sole monomers (h1), it is of advantage in accordance with the invention to use them in combination with further monomers (h1).

Monamers (h2):

(Meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acrylate; (meth)acrylic oxaalkyl esters or oxacycloalkyl esters such as ethyltriglycol (meth)acrylate and methoxyoligoglycol (Tmeth)acrylate having a molecular weight Mn of preferably 550; or other ethoxylated and/or propoxylated hydroxyl-free (meth)acrylic acid derivatives. These may include, in minor amounts, higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylolpropane di- or tri (meth)acrylate; or pentaerythritol di-, tri- or tetra(meth) acrylate. In the context of the present invention, minor amounts of higher-functional monomers (h2) here are amounts which do not cause crosslinking or gelling of the polyacrylate resins.

Monomers (h3):

Ethylenically unsaturated monomers which carry at least one acid group, preferably a carboxyl group, per molecule, or a mixture of such monomers. As component (h3) it is particularly preferred to use acrylic acid and/or methacrylic acid. It is also possible, however, to use other ethylenically unsaturated carboxylic acids having up to 6 carbon atoms in the molecule. Examples of such acids are ethacrylic acid, crotonic acid, maleic acid, fumaric acid, and itaconic acid. It is also possible to use ethylenically unsaturated oulfonic or phosphonic acids, and/or their partial esters, as component (h3). Further suitable monomers (h3) include mono(meth) acryloyloxyethyl maleate, succinate, and phthalate.

Monomers (h4):

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products from paraffinic hydrocarbons, such as mineral oil fractions, and may contain both branched and straight-chain acyclic and/or cycloaliphatic olefins. In the reaction of such olefina with formic acid and/or with carbon monoxide and water, a mixture of carboxylic acids is formed in which the carboxyl groups are located predominantly on a quaternary carbon atom. Other olefinic starting materials are, for example, propylene trimer, propylene tetramer, and diisobutylene. Alternatively, the vinyl esters may be prepared in a conventional manner from the acids; for example, by reacting the acid with acetylene. Particular preference—owing to their ready availability—is given to the use of vinyl esters of saturated aliphatic monocarboxylic acids having 9 to 11 carbon atoms and being branched on the alpha carbon atom.

Monomers (h5):

Reaction product of acrylic acid and/or methacrylic acid with the glycidyl ester of an alpha-branched monocarboxylic acid having 5 to 18 carbon atoms per molecule. The reaction of the acrylic or methacrylic acid with the glycidyl ester of a carboxylic acid having a tertiary alpha carbon atom may take place before, during or after the polymerization reaction. As component (h5) it is preferred to use the reaction product of acrylic and/or methacrylic acid with the glycidyl ester of Versatic® acid. This glycidyl ester is obtainable commercially under the name Cardura® E10. For further details, refer to Römpp Lexikon Lacke und Druckfarben, Georg Thieme Verlag, Stuttgart, N.Y., 1998, pages 605 and 606.

Monomers (h6):

Ethylenically unsaturated monomers substantially free from acid groups, such as olefins such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)acrylamide, N-methyl-, N,N-dimethyl-, N-ethyl-, N,N-diethyl-, N-propyl-, N,N-dipropyl, N-butyl-, N,N-dibutyl-, N-cyclohexyl- and/or N,N-cyclohexyl-methyl-(meth)acrylamide;

monomers containing epoxide groups, such as the glycidyl ester of acrylic acid, methacrylic acid, ethacrylic acid, crotonic acid; maleic acid, fumaric acid and/or itaconic acid;

vinylaromatic hydrocarbons, such as styrene, alpha-alkyltyrenes, especially alpha-methylstyrene, arylstyrenes, especially diphenylethylene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are marketed under the brand name VeoVa® by the company Deutsche Shell Chemie (for further details, refer to Römpp Lexikon Lacke und Druckfarben, Georg Thieme Verlag, Stuttgart, N.Y., 1998, page 598 and also pages 605 and 606), and/or the vinyl ester of 2-methyl-2-ethylheptanoic acid; and/or polysiloxane macromonomers having a number-average molecular weight Mn of from 1 000 to 40 000, preferably from 2 000 to 20 000, with particular preference from 2 500 to 10 000, and in particular from 3 000 to 7 000, and having on average from 0.5 to 2.5, preferably from 0.5 to 1.5, ethylenically unsaturated double bonds per molecule, as are described in DE-A-38 07 571 on pages 5 to 7, in DE-A-37 06 095 in columns 3 to 7, in EP-B-0 358 153 on pages 3 to 6, in U.S. Pat. No. 4,754,014 in columns 5 to 9, in DE-A-44 21 823, or in the international patent application WO 92/22615 on page 12, line 18 to page 18, line 10, or acryloxysilane-containing vinyl monomers, preparable by reacting hydroxy-functional silanes with epichlorohydrin and then reacting the reaction product with methacrylic acid and/or hydroxyalkyl esters of (meth) acrylic acid.

In accordance with the invention it is especially advantageous to select the monomers (h) so as to give hydroxyl-containing polyacrylate resins which have an OH number of preferably from 0 to 200, more preferably from 60 to 140, acid numbers of preferably from 20 to 100, more preferably from 25 to 50, glass transition temperatures Tg of preferably from −25 to +80° C., more preferably from −20 to +40° C., and number-average molecular weights of preferably from 1 500 to 30 000, more preferably from 1 500 to 20 000 (determined by gel permeation chromatography using polystyrene as internal standard).

The glass transition temperature Tg of the polyacrylate resins (H) is determined by the nature and amount of the monomers (h1) and, where appropriate (h2), (h3), (h4), (h5) and/or (h6) that are used. The skilled worker is able to select the monomers with the assistance of the following formula of Fox, which can be used for approximate calculation of the glass transition temperatures Tg of (co)polymers, especially polyacrylate resins:

$$1/Tg = \sum_{n=1}^{n=x} W_n/Tg_n; \quad \sum_n W_n = 1$$

$Tg$ = glass transition temperature of the polyacrylate resin $W_n$ = weight fraction of the nth monomer $Tg_n$ = glass transition temperature of the homopolymer of the nth monomer $x$ = number of different monomers Viewed in terms of its method, the preparation of the hydroxyl-containing polyacrylate resins (H) for inventive use has no special features but instead takes place in accordance with the customary and known methods of radical polymerization in the presence of at least one polymerization initiator.

Examples of suitable polymerization initiators are initiators which form free radicals, such as tert-butylperoxyethyl hexanoate, benzoyl peroxide, di-tert-amyl peroxide, azobisisobutyronitrile, and tert-butyl perbenzoate. The initiators are used preferably in an amount of from 1 to 25% by weight, with particular preference from 2 to 10% by weight, based on the overall weight of the monomers.

The polymerization is appropriately conducted at a temperature of from 80 to 200° C., preferably from 110 to 180° C.

It is preferred to commence the initiator feed a certain time, generally from about 1 to 15 minutes, before the monomers feed. Preference is also given to a process wherein the addition of initiator is commenced at the same time as the addition of the monomers and ended about half an hour after the addition of the monomers has been ended. The initiator is preferably added in a constant amount per unit time. After the end of the addition of initiator, the reaction mixture is held at polymerization temperature until (generally 1.5 hours) all of the monomers used have undergone substantially complete reaction. "Substantially complete reaction" is intended to denote that, preferably, 100% by weight of the monomers used have been converted but that it is also possible for a small residual monomer content of not more than up to about 0.5% by weight, based on the weight of the reaction mixture, to remain unreacted.

One particularly preferred process for the preparation of the polyacrylate resins (H) is described in DE-A-44 37 535.

In this process, in a first step, a polyurethane free from copolymerizable double bonds, especially a polyurethane (A), is introduced in organic solution, after which a mixture of at least one monomer (h1) and at least one monomer (h2) and also, where appropriate, in each case at least one monomer (h4), (h5) and/or (h6) is added, and the mixture is copolymerized. After these monomers (h) have undergone almost complete conversion, in a second process step a mixture of at least one monomer (h3) and also in each case at least one monomer (h1) (h2), (h4), (h5) and/or (h6) is added, after which the resulting reaction mixture is polymerized to completion.

In terms of apparatus as well, the preparation of the polyacrylate resins (H) for inventive use has no special features as far as its method is concerned but instead takes place with the aid of the methods, customary and known in the polymers field, of continuous or batchwise copolymerization under atmospheric or superatmospheric pressure in stirred tanks, autoclaves, tube reactors or Taylor reactors.

Examples of suitable copolymerization processes and apparatus are described in the patents DE-A-197 09 465, DE-C-197 09 476, DE-A-28 48 906, DE-A-195 24 182, EP-A-0 554 783, WO 95/27742 or WO 82/02387.

Following their preparation, the polyacrylate resins (H) are neutralized with at least one of the above-described suitable neutralizing agents (D), and dispersed in water. The total amount of neutralizing agent (D) used in the aqueous basecoat material of the invention is chosen such that from 1 to 100 equivalents, preferably from 50 to 90 equivalents, of the carboxyl groups of the polyurethanes (A) for inventive use and of the polyacrylate resins (H) are neutralized.

The fraction of the polyacrylate resins (H) in the aqueous basecoat materials of the invention can vary widely. It is preferably from 0.1 to 10%, more preferably from 0.5 to 8.0%, with particular preference from 0.6 to 6.0%, with very particular preference from 0.8 to 6.0%, and in particular from 1.0 to 6.0% by weight, based in each case on the overall weight of the respective aqueous basecoat material of the invention.

In yet another preferred embodiment of the aqueous basecoat material of the invention, it comprises at least one water-soluble or -dispersible polyester resin (I).

Examples of suitable starting products for preparing the polyester resins (I) are the compounds described above in connection with the preparation of the polyester polyols.

Examples of suitable polyester resins (I) and their preparation from said starting products are described in detail in the patents DE-A-40 09 858 or DE-A-44 37 535.

The fraction of the polyester resins (I) in the aqueous basecoat materials of the invention can also vary widely. It is preferably from 0.5 to 12%, more preferably from 0.7 to 10%, with particular preference from 0.8 to 9.0%, with very particular preference from 1.0 to 8.0%, and in particular from 1.5 to 7.0% by weight, based in each case on the overall weight of the respective aqueous basecoat material of the invention.

In addition to the constituents described above, the aqueous basecoat material of the invention may comprise customary and known additives (J) in effective amounts.

Examples of suitable additives (J) are organic and inorganic fillers such as chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers or wood flour; for further details refer to Römpp Lexikon Lacke und Druckfarben, Georg Thieme Verlag, 1998, pages 250 ff., "Pillers";

customary and known oligomeric and polymeric binders such as thermally curable, hydroxyl-containing, linear and/or branched and/or block, comb and/or random poly(meth)acrylates or acrylate copolymers, polyesters, alkyds, acrylated polyesters, polylactones, polycarbonates, polyethers, epoxy resin-amine adducts, (meth)acrylate diols, partially hydrolyzed polyvinyl esters, or polyureas;

customary and known thermally curable reactive diluents such as positionally isomeric diethyloctanediols or hydroxyl-containing hyper-branched compounds or dendrimers;

low-boiling and/or high-boiling organic solvents ("long solvents");

UV absorbers;

light stabilizers such as HPLLS compounds, benzotriazoles or oxalanilides;

free-radical scavengers;

thermolabile free-radical initiators such as organic peroxides, organic azo compounds or cleaving initiators such as dialkyl peroxides, peroxocarboxylic acids, peroxodicarbonates, peroxide esters, hydroperoxides, ketone peroxides, azo dinitriles or benzpinacol silyl ethers;

crosslinking catalysts such as dibutyltin dilaurate, lithium decanoate or zinc octoate, or amine-blocked organic sulfonic acids;

devolatilizers, such as diazadicycloundecane;

slip additives;

polymerization inhibitors;

defoamers;

emulsifiers, especially nonionic emulsifiers such as alkoxylated alkanols and polyols, phenols and alkylphenols or anionic emulsifiers such as alkali metal salts or ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphates, polyacrylic acids and their copolymers, or polyurethanes;

adhesion promoters such as tricyclodecanedimethanol;

leveling agents;

film-forming auxiliaries such as cellulose derivatives;

transparent fillers based on silica, alumina, titanium dioxide or zirconium oxide; for further details refer to Römpp Lexikon Lacke und Druckfarben, Georg Thieme Verlag, Stuttgart, 1998, pages 250 to 252;

other rheology control additives, such as those known from patents WO 94/22968, EP-A-0 276 501, EP-A-0 249 201 or WO 97/12945; crosslinked polymeric microparticles, as disclosed for example in EP-A-0 008 127; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride or ethylene-maleic anhydride copolymers and their derivatives or hydrophobically modified polyacrylates; and/or flame retardants.

Further examples of suitable coatings additives are described in the textbook "Lackadditive" by Johan Bieleman, Wiley-VCH, Weinheim, N.Y., 1998.

The aqueous basecoat materials of the invention preferably have a solids content at spray viscosity of from 5.0 to 60%, more preferably from 5.0 to 50%, with particular preference from 10 to 45%, with very particular preference from 13 to 40%, and in particular from 13 to 35% by weight, based in each case on the overall weight of the respective aqueous basecoat material of the invention.

The preparation of the aqueous basecoat material of the invention has no special features but instead takes place in a customary and known manner by mixing of the above-described constituents in appropriate mixing equipment such as stirred tanks, dissolvers or extruders in accordance with the techniques suitable for preparing the respective aqueous basecoat materials.

The aqueous basecoat material of the invention is used to produce the coatings of the invention, especially multicoat paint systems, on primed or unprimed substrates.

Suitable substrates are all surfaces for coating which are not damaged by curing of the coatings present thereon using heat. Suitable substrates comprise, for example, the moldings, films and fibers of the invention, metals, plastics, wood, ceramic, stone, textile, fiber assemblies, leather, glass, glass fibers, glass wool and rock wool, mineral-bound and resin-bound building materials, such as plasterboard panels and cement slabs or roof shingles, and composites of these materials. The coating system of the invention, accordingly, is also suitable for applications outside of automotive finishing, particularly automobile finishing. In such applications it is suitable particularly for the coating of furniture and for industrial coating, including coil coating, container coating, and the impregnation or coating of electrical components. In the context of industrial coatings it is suitable for coating virtually all parts for private or industrial use such as radiators, domestic appliances, small metal parts such as nuts and bolts, hubcaps, wheel rims, packaging, or electrical components such as motor windings or transformer windings.

In the case of electrically conductive substrates it is possible to use primers, which are prepared in a customary and known manner from electrocoat materials. Both anodic and cathodic electrocoat materials are suitable for this purpose, but especially cathodics.

With the multicoat paint system of the invention it is also possible to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations to DIN 7728T1). The plastics to be coated can of course also be polymer blends, modified plastics or fiber-reinforced plastics. It is also possible to employ the plastics that are commonly used in vehicle construction, especially motor vehicle construction.

In the case of unfunctionalized and/or a polar substrate surfaces, these may be subjected prior to coating in a known manner to a pretreatment, such as with a plasma or by flaming, or may be provided with a water-based primer.

The multicoat paint systems of the invention may be produced in a variety of ways.

A first preferred variant of the process of the invention comprises the following steps:

(I) preparing a basecoat film by applying the aqueous basecoat material of the invention to the substrate, (II) drying the basecoat film, (III) preparing a clearcoat film by applying a clearcoat material to the basecoat film, and (IV) jointly curing the basecoat film and the clearcoat film, to give the basecoat and the clearcoat (wet-on-wet technique).

This variant offers particular advantages especially in the context of the coating of plastics, and is therefore employed with particular preference in that utility.

A second preferred variant of the process of the invention comprises the following steps:

(I) preparing a surfacer film by applying a surfacer to the substrate, (II) curing the surfacer film, to give the surfacer coat, (III) preparing a basecoat film by applying the aqueous basecoat material of the invention to the surfacer coat, (IV) drying the basecoat film, (V) preparing a clearcoat film by applying a clearcoat material to the basecoat film, and (VI) jointly curing the basecoat film and the clearcoat film, to give the basecoat and the clearcoat (wet-on-wet technique).

A third preferred variant of the process of the invention comprises the following steps:

(I) preparing a surfacer film by applying a surfacer to the substrate, (II) drying the surfacer film, (III) preparing a basecoat film by applying the aqueous basecoat material of the invention to the surfacer film, (IV) drying the basecoat film, (V) preparing a clearcoat film by applying a clearcoat material to the basecoat film, and (VI) jointly curing the surfacer film, the basecoat film and the clearcoat film, to give the basecoat and the clearcoat (extended wet-on-wet technique).

The two last-mentioned variants offer particular advantages especially in the context of the coating of automobile bodies and are therefore employed with very particular preference in that utility.

It is found here to be a further particular advantage of the aqueous basecoat material of the invention and of the process of the invention that all customary and known clearcoat materials can be combined with the aqueous basecoat film of the invention in the context of the processes of the invention.

Examples of suitable known one-component (1K), two-component (2K) or multicomponent (3K, 4K) clearcoat materials are known from the patents DE-A-42 04 518, U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, EP-A-0 594 142, EP-A 0 604 992, WO 94/22969, EP-A-0 596 460 or WO 92/22615.

One-component (1K) clearcoat materials are known to contain hydroxyl-containing binders and crosslinking agents such as blocked polyisocyanates, tris-(alkoxycarbonylamino)triazines and/or amino resins. In another variant they include as binders polymers containing pendant carbamate and/or allophanate groups and carbamate- and/or allophanate-modified amino resin crosslinking agents (cf. U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071 or EP-A-0 594 142).

Two-component (2K) or multicomponent (3K, 4K) clearcoat materials include as essential constituents, as is known, hydroxyl-containing binders and polyisocyanate crosslinking agents, which are stored separately until they are used.

Examples of suitable powder clearcoat materials are known, for example, from the German patent DE-A-42 22 194 or from the BASF Lacke+Farbe AG product information bulletin "Pulverlacke", 1990.

Powder clearcoat materials include as essential constituents, as is known, binders containing epoxide groups, and polycarboxylic acid crosslinking agents.

Examples of suitable powder slurry clearcoat materials are known, for example, from the U.S. Pat. No. 4,268,542 and from the German patent applications DE-A-195 18 392.4 and DE-A-196 13 547, or are described in the German patent application DE-A-198 14 471.7, unpublished at the priority date of the present specification.

Powder slurry clearcoat materials, as is known, comprise powder clearcoat materials in dispersion in an aqueous medium.

UV-curable clearcoat materials are disclosed, for example, by the patents EP-A-0 540 884, EP-A-0 568 967 or U.S. Pat. No. 4,675,234.

Furthermore, the clearcoats may additionally be coated further with at least one other clearcoat, an example being an organically modified ceramic layer, thereby making it possible to improve significantly the scratch resistance of the multicoat paint system of the invention.

Accordingly, the multicoat paint systems of the invention can differ in their structure.

In a first preferred variant of the multicoat paint system of the invention, the following coats lie above one another in the stated order:

(1) a surfacer coat which absorbs mechanical energy, (2) the color and/or effect basecoat, and (3) a clearcoat.

In the second preferred variant of the multicoat paint system of the invention, the following coats lie above one another in the stated order:

(1) the color and/or effect basecoat, and (2) a clearcoat. This preferred variant is used in particular in the coating of plastics.

The aqueous basecoat material of the invention may be applied by all customary application methods, such as spraying, knifecoating, brushing, flowcoating, dipping, impregnating, trickling, or rolling, for example. The substrates to be coated may itself be at rest, with the application equipment or unit being moved. Alternatively, the substrate to be coated, especially a coil, may be moved, with the application unit being at rest relative to the substrate or being moved appropriately.

Preference is given to the use of spray application methods, such as compressed-air spraying, airless spraying, high-speed rotation, electrostatic spray application (ESTA), alone or in conjunction with hot spray application such as hot-air spraying, for example. Application may be conducted at temperatures of max. 70 to 80° C., so that suitable application viscosities are achieved without the short-term thermal stress being accompanied by any change in or damage to the aqueous basecoat material or its overspray, which may be intended for reprocessing. For instance, hot spraying may be configured such that the aqueous basecoat material is heated in the spray nozzle for only a very short time, or is heated just a short way upstream of the spray nozzle.

The spray booth used for the application may be operated, for example, with an optionally temperature-controllable circulation, which is operated with an appropriate absorption medium for the overspray, an example being the aqueous basecoat material itself.

In general, the surfacer film, basecoat film and clearcoat film are applied in a wet film thickness such that they cure to give coats having the coat thicknesses which are necessary and advantageous for their functions. In the case of the surfacer coat, this coat thickness is from 10 to 150, preferably from 15 to 120, with particular preference from 10 to 100, and in particular from 10 to 90 µm; in the case of the basecoat it is from 5 to 50, preferably from 5 to 40, with particular preference from 5 to 30, and in particular from 10 to 25 µm; and in the case of the clearcoats it is from 10 to 100, preferably from 1S to 80, with particular preference from 20 to 70, and in particular from 25 to 60 µm.

The surfacer film, basecoat film and clearcoat film are cured thermally.

Full curing may take place after a certain rest time. Its duration may be from 30 s to 2 h, preferably from 1 min to 1 h, and in particular from 1 min to 45 min. The rest time serves, for example, for the coating films to flow and undergo devolatilization, or for the evaporation of volatile constituents such as solvents. The rest time may be assisted and/or shortened by the application of elevated temperatures of up to 90° C. and/or by a reduced atmospheric humidity <10 g water/kg air, especially <5 g water/kg air, provided this does not entail any damage or change to the coating films, such as premature complete crosslinking, for instance.

The thermal curing has no special features in terms of its method but instead takes place in accordance with the customary and known methods, such as heating in a convection oven or irradiation with IR lamps. This thermal curing may also take place in stages. Advantageously, thermal curing takes place at a temperature of from 50 to 100° C., with particular preference from 80 to 100° C., and in particular from 90 to 100° C., for a time of from 1 min up to 2 h, with particular preference from 2 min up to 1 h, and in particular from 3 min to 30 min. If substrates of high heat resistance are used, thermal crosslinking may also be conducted at temperatures above 100° C. In this case it is generally advisable not to exceed temperatures of 180° C., preferably 160° C., and in particular 155° C.

In the case of clearcoats, depending on the clearcoat material used, curing may also take place with actinic radiation or both thermally and with actinic radiation (dual cure). Suitable actinic radiation includes electromagnetic radiation such as near infrared light (NIR), visible light, UV radiation or X-rays, and/or corpuscular radiation such as electron beams.

The multicoat paint systems of the invention exhibit an outstanding profile of properties which is very well balanced in terms of mechanics, optics, corrosion resistance, and adhesion. Thus the multicoat paint systems of the invention possess the high optical quality and intercoat adhesion required by the market and do not give rise to any problems such as deficient surfacer-coat condensation resistance, cracking (mud-cracking) in the basecoats or leveling defects or surface structures in the clearcoats.

In particular, the multicoat paint system of the invention exhibit an outstanding metallic effect, an excellent D.O.I. (distinctiveness of the reflected image), and an outstanding surface smoothness. They are weathering-stable, resistant to chemicals and bird droppings, are scratch resistant, and exhibits very good reflow behavior.

Not least, however, it proves to be a very special advantage that the use of the aqueous basecoat materials of the invention in the production of the multicoat paint systems of the invention results in only barely visible optical defects, if any.

Accordingly, the substrates coated with them have particular advantages such as a prolonged service life, a better esthetic impression on the viewer, and improved technological usefulness, so making them particularly economically attractive.

EXAMPLES AND COMPARATIVE EXPERIMENTS

Preparation Example 1

The Preparation of an Aqueous Polyurethane Dispersion (A)

716.6 parts by weight of a condensation product (number-average molecular weight: 1410) of 1.81 mol of a polymeric fatty acid (dimer content at least 98% by weight, trimer content not more than 2.0% by weight, monomer content traces at most), 0.82 mol of isophthalic acid, 0.61 mol of hexanediol and 0.61 mol of neopentyl glycol, 61 parts by weight of dimethylolpropionic acid, 10.6 parts by weight of neopentyl glycol, 365 parts by weight of methyl ethyl ketone and 308.3 parts by weight of m-tetramethylxylylidene diisocyanate were heated at 80 degrees Celsius under nitrogen and with stirring in a suitable reaction vessel. Reaction was continued to an isocyanate content of 1.1% by weight, based on the overall amount of reaction mixture. Subsequently 52.6 parts by weight of trimethylolpropane were added, after which the resulting reaction mixture was stirred at 80 degrees Celsius until free isocyanate groups were no longer detectable. Thereafter, slowly, 33 parts by weight of dimethylethanolamine, 255 parts by weight of butyl glycol and, subsequently, 2153 parts by weight of deionized water were stirred in. The methyl ethyl ketone was distilled off under reduced pressure. This gave a fine dispersion whose pH was adjusted to 7.4 using dimethylethanolamine and whose nonvolatiles fraction was adjusted to 31% by weight using deionized water.

Preparation Example 2

The Preparation of an Aqueous Polyester Resin Solution (I)

A reactor equipped with stirrer, thermometer and packed column was charged with 729 parts by weight of neopentyl glycol, 768 parts by weight of hexanediol, 462 parts by weight of hexahydrophthalic anhydride and 1710 parts by weight of a polymeric fatty acid (dimer content at least 98% by weight, trimer content not more than 2% by weight, monomer content traces at most), and this initial charge was melted. The resulting melt was heated with stirring in such a way that the overhead column temperature did not exceed 100 degrees Celsius. Esterification was carried out at 220 degrees Celsius maximum until an acid number of 9 was reached. After the mixture had cooled to 180 degrees Celsius, 768 parts by weight of trimellitic anhydride were added and esterification was continued until an acid number of 32 was reached. Thereafter, the reaction mixture was cooled to 120 degrees Celsius and diluted with 1392 parts by weight of butyl glycol. After it had cooled to 90 degrees Celsius, 158 parts by weight of dimethylethanolamine were stirred in slowly, followed by 1150 parts by weight of deionized water. The resulting polyester resin solution was adjusted to a pH of 7.6 using dimethylethanolamine and to a nonvolatiles fraction of 60% by weight using deionized water.

Preparation Example 3
The Preparation of a Polyacrylate Resin (H)

500 parts by weight of a condensation product (number-average molecular weight: 1423) of 1.0 mol of a polymeric fatty acid (dimer content at least 98% by weight, dimer content not more than 2.0% by weight, monomer content traces at most), 1.5 mol of isophthalic acid, 1.6 mol of neopentyl glycol and 1.7 mol of hexanediol, 31.2 parts by weight of neopentyl glycol, 185 parts by weight of methyl ethyl ketone, 201.7 parts by weight of m-tetramethylxylylidene diisocyanate and 0.7 part by weight of dibutyltin dilaurate were heated at 80 degrees Celsius under nitrogen and with stirring. The reaction was continued to an isocyanate content of 1.3% by weight, based on the overall amount of reaction mixture. Thereafter, 30 parts by weight of diethanolamine were added and the resulting reaction mixture was stirred at 80 degrees Celsius until isocyanate groups were no longer detectable. Subsequently, 466 parts by weight of butyl glycol were stirred in, after which the methyl ethyl ketone was distilled off under reduced pressure. The resulting polyurethane solution was then adjusted to a nonvolaciles fraction of 60% by weight using butyl glycol.

A steel vessel equipped with monomer feed, initiator feed, thermometer, oil heating and reflux condenser was charged with 28.44 parts by weight of butyl glycol and 24.24 parts by weight of the abovementioned polyurethane solution, and this initial charge was heated to 110 degrees Celsius. Then a solution of 5.1 parts by weight of t-butyl perethylhexanoate in 6.0 parts by weight of butyl glycol was added uniformly at a rate such that the addition was over after 5.5 hours. The beginning of the addition of initiator was also accompanied by commencement of the addition of a mixture of 18.36 parts by weight of n-butyl mathacrylate, 17 parts by weight of methyl methacrylate, 17 parts by weight of lauryl methacrylate, 17.34 parts by weight of hydroxypropyl acrylate and 12.75 parts by weight of styrene. The monomer mixture was added uniformly at a rate such that the addition was over in five hours. After all of the initiator solution had been added, the reaction mixture was held at 110 degrees Celsius for a further hour.

Subsequently, a solution of 1.17 parts by weight of t-butyl perethylhexanoate in 3.5 parts by weight of butyl glycol was added uniformly at a rate such that the addition was over after 1.5 hours. The beginning of the addition of the initiator solution was also accompanied by the commencement of addition of a mixture of 5.85 parts by weight of acrylic acid and 4.65 parts by weight of n-butyl methacrylate, 2.94 parts by weight of methyl methacrylate, 5.90 parts by weight of lauryl methacrylate, 1.25 parts by weight of hydroxypropyl acrylate and 2.94 parts by weight of styrene. The monomer mixture was added uniformly at a rate such that the addition was over within one hour. Thereafter, the temperature of the reaction mixture was held at 110 degrees Celsius for 1.5 hours more. The resulting resin solution was concentrated by distillation under reduced pressure to a solids content of 80% by weight and at this temperature was neutralized with dimethylethanolamine over the course of 30 minutes to a degree of neutralization of 80%. The resin solution was cooled to 60 degrees Celsius, after which the heating was shut off. Then water was added slowly until the solids content of the dispersion was 40% by weight. The dispersion had an acid number of 36.7 mg KOH/g and a pH of 7.6.

Examples 1 and 2 and Comparative Exeriments C1 and C2

The Preparation of Inventive (Examples 1 and 2) and Noninventive (Comparative Exeriments C1 and C2) Aqueous Basecoat Materials The preparations of the inventive aqueous basecoat materials of examples 1 and 2 and of the noninventive aqueous basecoat material of comparative experiment C2 were conducted in analogy to the preparation instructions indicated below for the noninventive aqueous basecoat material of comparative experiment C1. Table 1 gives an overview of the amounts of the starting products employed.

For comparative experiment C1, the thickener 1 (paste of a synthetic sodium magnesium phyllosilicate from Laporte; 3% in water) was introduced initially. Added to this with stirring were deionized water, thickener 3 (3% aqueous solution of a polyacrylic acid from Allied Colloids; trade name: Viscalex), the polyurethane dispersion (A) from preparation example 1, the polyester resin solution (I) from preparation example 2, the solution of the polyacrylate (H) from preparation example 3, butyl glycol, a commercial melamine resin in butanol (Maprenal® VMF3924), a silica filler paste (12 parts by weight of Syloid® ED-3 from Grace; 30 parts by weight of the abovementioend polyester resin solution (I)), a neutralizing agent (D) (dimethylethanolamine, 10% in water), a solution of a commercial defoamer based on alkynediol (50% in butyl glycol; from Air Products), deionized water, a pigment paste 1 (63 parts by weight of polyurethane dispersion, 31 parts by weight of titanium rutile Tayca® MT500HD from Tayca), a pigment paste 2 (64 parts by weight of polyurethane dispersion and 32 parts by weight of titanium dioxide UVL 530 from Kemira).

Prepared separately from this was an aluminum pigment slurry composed of 5.0 parts by weight of a commercial aluminum paste (Alu-Stapa-Hydrolux® 2192 from Eckart), 6.0 parts by weight of solvent and 2.4 parts by weight of the polyester resin solution (I). This aluminum pigment slurry was stirred into the mixture described above.

The resultant mixture was then neutralized to a pH of about 8.0 using the neutralizing solution (D) and was adjusted using deionized water to a viscosity of 65 mPas under a shear of 1291 $s^{-1}$.

For comparative experiment C2, comparative experiment C1 was repeated but using the thickener 2 instead of the thickener 1. Said thickener 2 is a 3% solution of a synthetic sodium magnesium phyllosilicate from Sü dchemie.

For example 1, comparative experiment C1 was repeated but using the thickener 4 instead of the thickener 3. Said thickener 4 is a mixture of 50% by weight of a polyurethane-based associative thickener (G) (Nopco® DSX1550 from Henkel) and 50% by weight of butyl glycol.

For example 2, example 1 was repeated but using, instead of butyl glycol, dipropylene glycol monoalkyl ether for the preparation of the aluminum pigment slurry.

The aqueous basecoat materials of comparative experiment C2 and of examples 1 and 2 were also adjusted using neutralizing solution (D) to a pH of about 8.0 and using deionized water to a viscosity of 65 mPas under a shear of 1291 $s^{-1}$.

Table 1 gives an overview of the amounts of the starting products and of the composition of the aqueous basecoat materials.

TABLE 1

The composition of the inventive (examples 1 and 2) and of the noninventive (comparative experiments C1 and C2) aqueous basecoat materials

| Constituents | Comparative experiments: | | Examples: | |
|---|---|---|---|---|
| | C1 | C2 | 1 | 2 |
| Thickener 1 | 29 | — | 29 | 29 |
| Thickener 2 | — | 29 | — | — |
| Deionized water | 9.0 | 9.0 | 9.0 | 9.0 |
| Thickener 3 | 5.5 | 5.5 | — | — |
| Polyurethane dispersion (A) | 21.5 | 21.5 | 21.5 | 21.5 |
| Polyester solution (I) | 2.0 | 2.0 | 2.0 | 2.0 |
| Polyacrylate resin solution (H) | 5.0 | 5.0 | 5.0 | 5.0 |
| Butyl glycol | 2.0 | 2.0 | 2.0 | 2.0 |
| Melamine resin (B) | 5.0 | 5.0 | 5.0 | 5.0 |
| Filler paste | 1.2 | 1.2 | 1.2 | 1.2 |
| Neutralizing agent (D) | 0.4 | 0.4 | 0.4 | 0.4 |
| Defoamer | 2.0 | 2.0 | 2.0 | 2.0 |
| Thickener 4 | — | — | 1.6 | 1.6 |
| Deionized water | 4.0 | 4.0 | 4.0 | 4.0 |
| Pigment paste 1 | 4.3 | 4.3 | 4.3 | 4.3 |
| Pigment paste 2 | 0.8 | 0.8 | 0.8 | 0.8 |
| Alu-Stapa-Hydrolux ® | 5.0 | 5.0 | 5.0 | 5.0 |
| Butyl glycol | 6.0 | 6.0 | 6.0 | — |
| Dipropylene glycol methyl ether | — | — | — | 6.0 |
| Polyester solution (I) | 2.4 | 2.4 | 2.4 | 2.4 |

The viscosity behavior of the inventive (examples 1 and 2) and of the noninventive (comparative experiments C1 and C2) aqueous basecoat materials was measured under different shear rates. The results can be found in tab. 2.

TABLE 2

The viscosity behavior of the inventive (examples 1 and 2) and of the noninventive (comparative experiments C1 and C2) aqueous basecoat materials

| | Viscosity (mPas): | | | |
|---|---|---|---|---|
| | Comparative experiments: | | Examples | |
| Shear rate ($s^{-1}$) | C1 | C2 | 1 | 2 |
| 34 (outgoing curve) | 360 | 220 | 355 | 350 |
| 1000 | 73 | 73 | 73 | 73 |
| 34 (return curve) | 250 | 180 | 245 | 235 |

The values from table 2 demonstrate that the aqueous basecoat materials of examples 1 and 2 and of comparative experiments C1 and C2 had a comparable (comparative experiment C2 on the one hand and examples 1 and 2 and comparative experiment C1 on the other) or identical (examples 1 and 2 and comparative example C1) viscosity behavior.

Examples 3 and 4 and Comparative Experiments C3 and C4

Testing of the Inventive (Examples 3 and 4) and of the Noninventive (Comparative Experiments C3 and C4) Aqueous Basecoat Materials for Their Action Against the Formation of Optical Defects For example 3, the inventive aqueous basecoat material of example 1 was used.

For example 4, the inventive aqueous basecoat material of example 2 was used.

For comparative experiment C3, the noninventive aqueous basecoat material of comparative experiment C1 was used.

For comparative experiment C4, the noninventive aqueous basecoat material of comparative experiment C2 was used.

The test panels of examples 3 and 4 and of comparative experiments C3 and C4 were prepared in accordance with the following general instructions:

Steel panels coated cathodically with a commercial electrocoat material (electrocoat with a thickness of 18–22 μm) were first coated with a commercial filler from BASF Coatings AG, using a cup-type gun, and baked.

This gave a surfacer with a thickness of from 35 to 40 μm. Atop the surfacer there were then applied, in the same way, the inventive and the noninventive aqueous basecoat materials (cf. table 1), which were predried at 80° C. for 10 minutes. Following the cooling of the panels, a coat of commercial two-component high-solids clearcoat material from DuPont was applied in each case, predried at room temperature for 10 minutes, and then crosslinked together with the basecoats at 140° C. for 45 minutes. This gave basecoats with a thickness of 15 μm and clearcoats with a thickness of 44 μm.

1. Light Spots

In the wet sanding of defects in an original finish or in a surfacer, water droplets remain on the parts of the body that are to be overcoated with basecoat and clearcoat. These water droplets are made up of water, abrasion dust from clearcoat and/or surfacer, and residues of the abrasive paper. Following the drying of these water droplets and subsequent coating with the basecoat and clearcoat, the sites of the dried-out water are visible as light (-colored) spots.

In order to simulate this effect, abrasion water droplets (deionized water+abrasion dust from surfacer and clearcoat+abrasive paper from Plochmann, softened in this composition) of various sizes were applied to the respective test panels, dried at room temperature and coated with the respective basecoat materials employed for the original finish and described in table 1 and with the two-component high-solids clearcoat material from DuPont. The resulting color differences in the coatings (light spots) were assessed visually. The results obtained can be found in table 3.

2. Polishing Spots

Polishing sites were produced on the test panels using a red/white felt pad (Buffing Pad from 3M, No. 049-5765) and the gray polishing paste from 3M (No. 029-2778). In the subsequent coating with the basecoat materials described in table 1 and the abovementioned clearcoat material, these polishing sites were clearly visible on account of their different color. The respective difference in color was determined visually. The results obtained can be found in table 3.

3. Abrasion Spots

Using an abrasive paper from Plochmann with a grade of 2000, both a round and a cross-shaped abrasion site were applied to the test panels. These abrasion sites were coated with the basecoat materials described in table 1 and with the abovementioned clearcoat material.

The respective color difference was determined visually. The results obtained can be found in table 3.

The color difference, i.e., the obviousness of the defects, was scored as follows:

Rating Meaning 1 defects not visible 2 defects very slightly visible 3 defects slightly visible 4 defects markedly visible 5 defects very markedly visible

TABLE 3

The effect of the inventive (examples 3 and 4) and of the noninventive (comparative experiments C3 and C4) aqueous basecoat materials on the formation of optical defects

| Optical defects | Comparative experiments: | | Examples: | |
| --- | --- | --- | --- | --- |
| | C3 | C4 | 3 | 4 |
| Light spots | 4 | 5 | 2 | 2 |
| Polishing spots | 4 | 5 | 4 | 2–3 |
| Abrasion spots | 3–4 | 4 | 2–3 | 2 |

The results demonstrate that by means of the aqueous basecoat materials of the invention the formation of optical defects can be effectively suppressed.

An additional improvement results from the use of dipropylene glycol monoalkyl ether. The comparison of the results in table 3 with the aqueous basecoat material viscosity behavior shown in the overview in table 2 underlines the fact that said behavior, surprisingly, is not responsible for the advantageous effect of the aqueous basecoat materials of the invention.

What is claimed is:

1. A method for supressing optical defects in a paint system, wherein the paint system is one of a multicoat color paint system, a multicoat effect paint system, a multicoat color and effect paint system, a color refinish paint system, an effect refinish paint system, and a color and effect refinish paint system, comprising including an associative thickener in the paint system, wherein the associative thickener comprises a dipropylene glycol monoalkyl ether and optionally a polyurethane-based associative thickener, wherein the alkyl in the dipropylene glycol monoalkyl ether is at least one of n-pentyl and n-hexyl.

2. The method of claim 1, wherein the paint system comprises at least one basecoat layer and at least one clearcoat layer.

3. The method of claim 2, wherein the basecoat layer is produced from an aqueous basecoat material.

4. The method of claim 3, wherein the aqueous basecoat material comprises a polyurethane polymer.

5. The method of claim 1, wherein the associative thickener is present in a basecoat layer.

6. The method of claim 1, wherein the polyurethane-based associative thickener and the dipropylene glycol monoalkyl ether are present in a basecoat layer.

7. The method of claim 1, wherein the optical defects comprise at least one of:

i) light-colored spots, introduced by at least one of dried-up liquid residues and abrasion dust residues, which remain after abrading of defects in the paint system or in a surfacer that is to be coated with the paint system; and ii) polishing spots, induced by the polishing of defects in the paint system, which is performed for the purpose of refinishing the paint system.

8. The method of claim 3, wherein the aqueous basecoat material comprises (A) at least one water-soluble or -dispersible polyurethane, (B) at least one crosslinking agent, (C) at least one pigment that is at least one of a color pigment, an effect pigment, and a color and effect pigment, (D) at least one neutralizing agent, (E) at least one inorganic thickener, (F) an associative thickener comprising a dipropylene glycol monoalkyl ether and optionally a polyurethane-based associative thickener, wherein the alkyl in the dipropylene glycol monoalkyl ether is at least one of n-pentyl and n-hexyl, (G) optionally, at least one water-soluble or -dispersible polyacrylate resin prepared in the presence of a water-soluble or -dispersible polyurethane, and (H) optionally, at least one water-soluble or -dispersible polyester resin.

9. The method of claim 8, wherein the aqueous basecoat material, based on its overall weight, contains from 0.5 to 11% by weight of the dipropylene glycol monoalkyl ether.

10. The method of claim 8, wherein the aqueous basecoat material, based on its overall weight, contains from 0.1 to 4% by weight of the polyurethane-based associative thickener.

11. The method of claim 8, wherein the aqueous basecoat material further comprises at least one additive.

12. The paint system prepared by the process of claim 1.

13. The paint system of claim 12, wherein the paint system is one of an original coating for a motor vehicle body, an industrial coating, an electrical components coating, a coil coating, a packaging coating, a plastics coating, and a furniture coating.

14. An aqueous basecoat material comprising (A) at least one water-soluble or -dispersible polyurethane, (B) at least one crosslinking agent, (C) at least one pigment that is at least one of a color pigment, an effect pigment, and a color and effect pigment, (D) at least one neutralizing agent, (E) at least one inorganic thickener, (F) an associative thickener comprising a dipropylene glycol monoalkyl ether and optionally a polyurethane-based associative thickener, wherein the alkyl in the dipropylene glycol monoalkyl ether is at least one of n-pentyl and n-hexyl, (G) optionally, at least one water-soluble or -dispersible polyacrylate resin prepared in the presence of a water-soluble or -dispersible polyurethane, and (H) optionally, at least one water-soluble or -dispersible polyester resin.

15. The aqueous basecoat material of claim 14, wherein the aqueous basecoat material, based on its overall weight, contains 0.5 to 11% by weight of the dipropylene glycol monoalkyl ether.

16. The aqueous basecoat material of claim 14, wherein the aqueous basecoat material, based on its overall weight, contains from 0.1 to 4% by weight of the polyurethane-based associative thickener.

17. The aqueous basecoat material of claim 14 further comprises at least one additive.

18. A paint system comprising at least one basecoat layer; wherein the paint system is one of a multicoat color paint system, a multicoat effect paint system, as multicoat color and effect paint system, a color refinish paint system, an effect refinish paint system, and a color and effect refinish paint system; and wherein the basecoat layer is produced from the aqueous basecoat material of claim 14.

* * * * *